United States Patent [19]
Beirens

[11] Patent Number: 6,113,155
[45] Date of Patent: Sep. 5, 2000

[54] MODULAR NESTING METAL CONDUIT, IN PARTICULAR FOR DISCHARGING FUMES

[75] Inventor: Marcel Beirens, Buzancais, France

[73] Assignee: Constructions Metalliques Mecaniques Beirens C.M.M. Beirens, SA, Buzancais, France

[21] Appl. No.: 09/101,109

[22] PCT Filed: Dec. 3, 1997

[86] PCT No.: PCT/FR97/02187

§ 371 Date: Jul. 17, 1998

§ 102(e) Date: Jul. 17, 1998

[87] PCT Pub. No.: WO98/25066

PCT Pub. Date: Jun. 11, 1998

[30] Foreign Application Priority Data

Apr. 12, 1996 [FR] France ................................. 96 14857

[51] Int. Cl.$^7$ .............................. F23L 17/02; F16L 39/00
[52] U.S. Cl. ...................... 285/123.16; 285/47; 285/374; 285/110; 454/45
[58] Field of Search .............................. 285/47, 374, 302, 285/110, 111, 123.15, 123.16; 454/45, 47

[56] References Cited

U.S. PATENT DOCUMENTS

| | | |
|---|---|---|
| 3,842,721 | 10/1974 | Cardiff ....................................... 454/47 |
| 3,872,780 | 3/1975 | Zanias ....................................... 454/47 |
| 4,029,343 | 6/1977 | Stone ....................................... 285/302 |
| 4,269,436 | 5/1981 | Medney ..................................... 285/47 |
| 4,462,618 | 7/1984 | Stone ........................................ 285/47 |
| 4,502,370 | 3/1985 | Baileys et al. ............................. 454/47 |
| 4,538,834 | 9/1985 | Brady et al. ............................... 285/47 |
| 4,573,400 | 3/1986 | Foy ........................................... 454/47 |
| 4,608,963 | 9/1986 | Townsend et al. ........................ 454/47 |
| 4,666,189 | 5/1987 | Taylor et al. .............................. 285/47 |
| 4,728,479 | 3/1988 | Merkovsky .............................. 285/111 |
| 4,793,383 | 12/1988 | Gyory et al. ............................... 285/47 |
| 4,846,147 | 7/1989 | Townsend et al. ........................ 285/47 |
| 5,651,732 | 7/1997 | Dufour ..................................... 454/47 |

FOREIGN PATENT DOCUMENTS

| | | |
|---|---|---|
| 611875A1 | 8/1994 | European Pat. Off. . |
| 713044A1 | 5/1996 | European Pat. Off. . |
| 3943417 | 8/1990 | Germany ................................ 285/111 |
| 595936 | 7/1959 | Italy ....................................... 285/111 |
| 441898 | 1/1968 | Switzerland ........................... 285/111 |

*Primary Examiner*—Eric K. Nicholson
*Attorney, Agent, or Firm*—Duane, Morris & Heckscher, LLP

[57] ABSTRACT

An interfitting modular metal duct made up of elements forming an inner duct, pairs of elements being united by respective collars, sealing between the two elements being provided by a lip gasket and a fold chamber mounted in the female end of an element and bearing against the outside surface of the corresponding male portion.

9 Claims, 5 Drawing Sheets

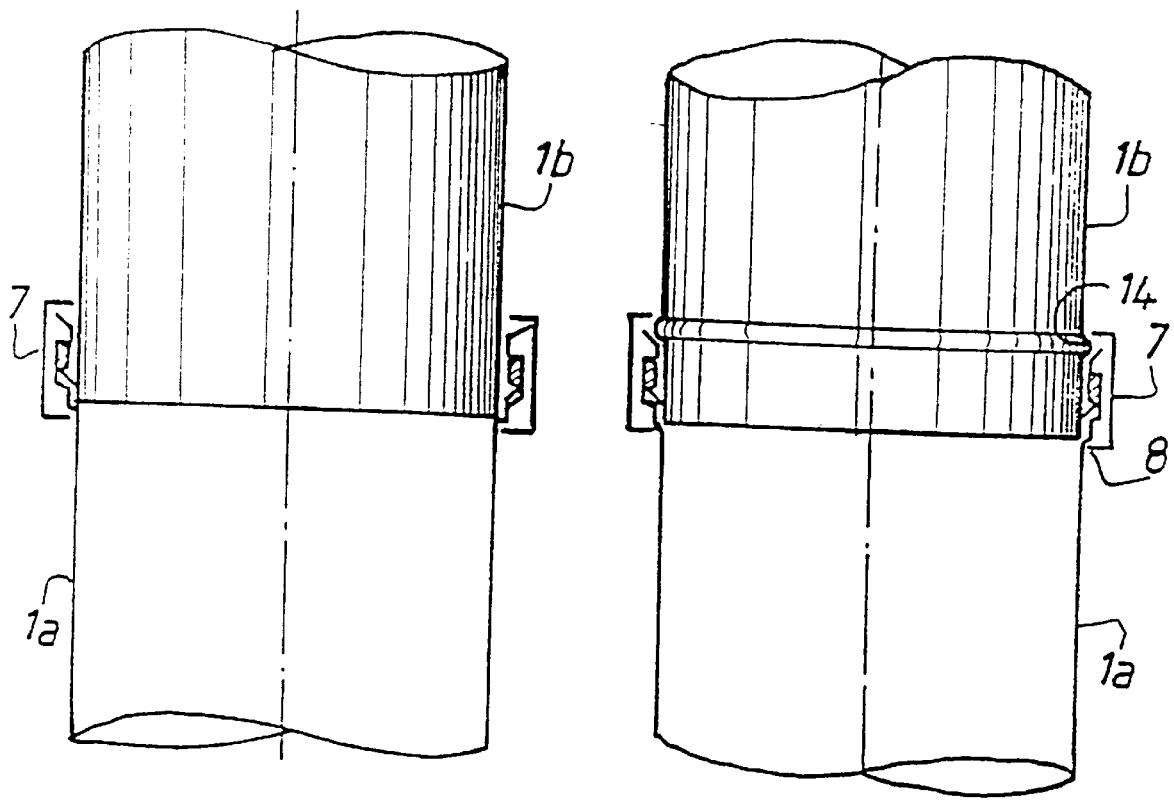
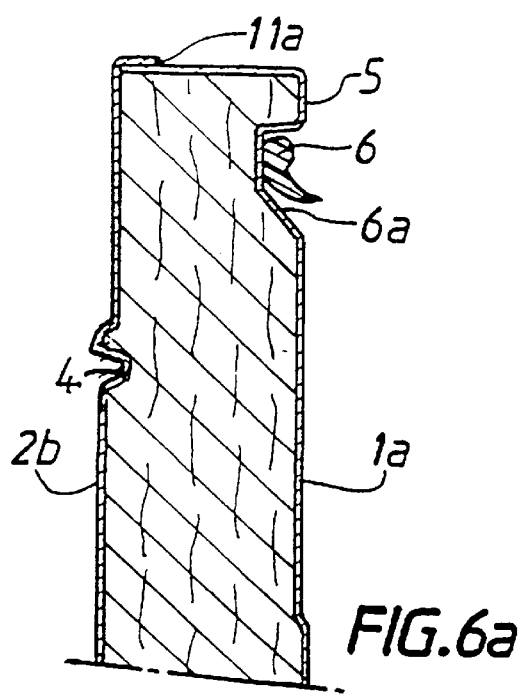
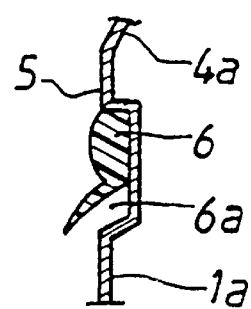
FIG. 2
FIG. 1
FIG. 6a
FIG. 3

MODULAR NESTING METAL CONDUIT, IN PARTICULAR FOR DISCHARGING FUMES

The present invention relates to a modular metal duct designed particularly, but not exclusively, for discharging flue gases from boilers.

BACKGROUND OF THE INVENTION

In general, such ducts are known and are built up of elements suitable for being interconnected, each having a reduced-diameter male endpiece at one end, and an enlarged-diameter female endpiece at its other end.

In domestic installations, where combustion gases are to be discharged from a cooker, connection between two adjacent duct elements is generally the result of a friction assembly, with successive elements merely being fitted one within another. It is also known to place collars along the length of pipes assembled together in this way for the purpose of fixing such pipes to an adjacent wall, and such collars can optionally serve to reinforce the connection between two successive elements.

Large-diameter chimneys for industrial installations are generally made either of concrete or of steel, with the steel elements being united via flanges that are welded on in the factory and being transported directly to the site.

For installations of medium size, the present practice is to use modular ducts made up of tubes that are connected together end to end. Sealing means may be provided between two tubes, but unfortunately such sealing is insufficient against condensed flue gases, particularly when the duct is used with a counter slope. In addition, they are unsuitable for being cut to length, for example so that the collars correspond to joints between facing stones.

OBJECTS AND SUMMARY OF THE INVENTION

A first object of the present invention is to improve sealing at the junction between two tubular elements, said elements being easy to disassemble and then reassemble.

A second object of the present invention is to provide a modular duct in which at least one element is capable of being cut to a desired length while nevertheless conserving good sealing characteristics for the assembly.

According to the invention, the interfitting modular metal duct, in particular for a chimney, comprises at least one inner duct made up of interconnected elements each having a male end and a female end that are interfitted in succession, and means for uniting two successive tubular elements, and the female end includes a lip gasket with a fold chamber.

In this way, sealing is guaranteed between two elements by the lip of the gasket mounted in the female endpiece bearing against the outside surface of the male endpiece. After assembly, the lip is pressed against said surface by the pressure that obtains in the fold chamber.

In an embodiment of the invention, the duct comprises an outer duct or envelope surrounding the inner duct and mounted the opposite way round to the inner duct elements, two duct elements (an inner element and an outer element) being assembled together by a gasket stuck at a head end, insulation being inserted between the two ducts.

The invention thus provides two layers of connection, thereby increasing the stiffness of the assembly.

In yet another embodiment of the invention, the duct further comprises a load-carrying modular outer envelope for assembling together two concentric elements, respectively an inner element and an outer element, by surrounding them, the assembly zones of the outer envelope lying, after assembly, in the middle of the other two elements.

This provides a duct that is automatically stable and self-supporting, i.e. its stability is ensured at a single point by being anchored to the ground, thereby avoiding any need for stays or stability-ensuring means.

BRIEF DESCRIPTION OF THE DRAWINGS

Other characteristics and advantages of the present invention appear from the following description of particular embodiments, given purely by way of non-limiting example, and with reference to the accompanying drawings, in which:

FIG. 1 is a view of a duct of the invention;

FIG. 2 is an identical view of a duct in which one of its elements has been cut to length;

FIG. 3 is a view on a larger scale showing the profile of the female element;

FIG. 6a is a view showing an alternative way of assembling inner and outer ducts;

MORE DETAILED DESCRIPTION

Figure 4:
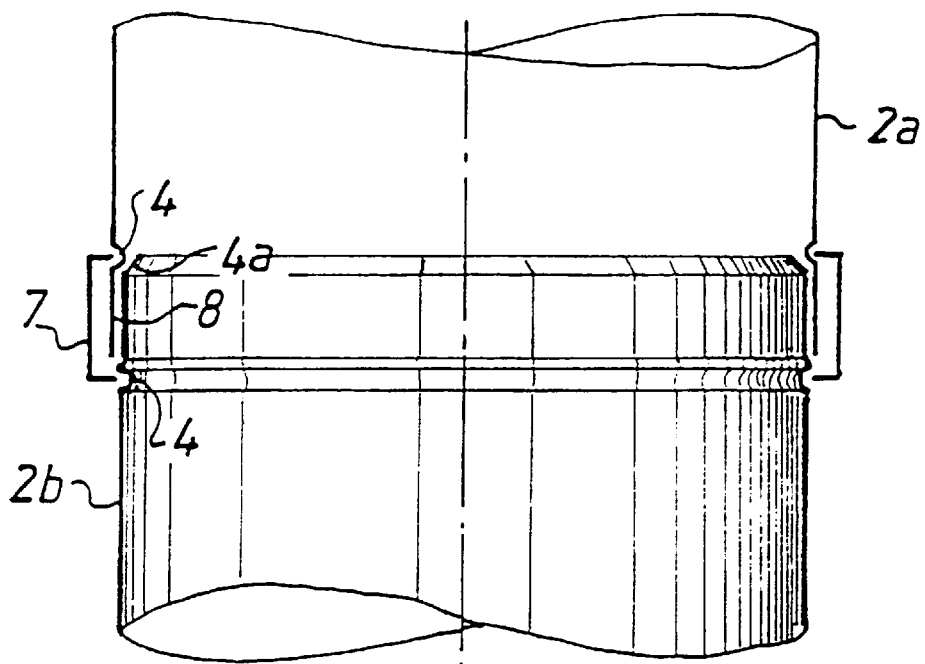
FIG. 4 is a view of the outer duct.

FIG. 1 shows two duct elements assembled together via a female duct end 1a and a male duct end 1b. In the vicinity of its bottom portion, the male duct may present a rim 14 bearing against a flared edge 4a of the expanded portion of the element 1a (which is shown on a larger scale in FIG. 3). In practice, the rim 14 may be omitted insofar as it performs no mechanical or sealing function. This is what happens when the tube is cut to length.

Above the edge 4a, there is a housing 5 and a lip gasket 6 whose lip bears against the outside wall of the element 1b after it has been assembled inside the female portion of the element 1a. The gasket 6 is stuck to the inside of the peripheral ring 5, and beneath the lip 6 there is provided a fold chamber 6a which serves, after assembly, to establish excess pressure for pressing the lip 6 against the element 1b. For example, providing the ducts are to work at a temperature of no more than 200° C., the lip gasket 6 may be made of silicone. For use at higher temperatures, it may be replaced by an O-ring made of ceramic fibers.

It is an aspect of the invention, illustrated for example by FIG. 2, that the female end of one element is dimensioned and structured to engage the male end of an adjacent element at any selected point along a length of the male end. The adjacent elements are attachable by a collar at the female end having a gasket, with a lip and a chamber adjacent to the lip, by which the female end engages over the male end. As can be seen clearly from FIG. 2, the gasket of the female end on the lower part 1a can engage around the smooth cylinder shape of the male part of the upper element 1b at any selected point. The female end maintains sealing at such selected point because the lip gasket exerts the same sealing action at any point along the male end. Therefore, the male end can be cut to any length required to adapt the duct to an available space, and the female end engages over the cut-off male end. The rim 14 has been removed. The bottom portion of the element 1b naturally rests in a setback 8 provided at the female top end of the element 1a. Mechanical contact and automatic centering are thus ensured. The connection zone between the elements 1a and 1b is surrounded by a collar 7 shown diagrammatically in FIGS. 1 and 2.

Figure 5:
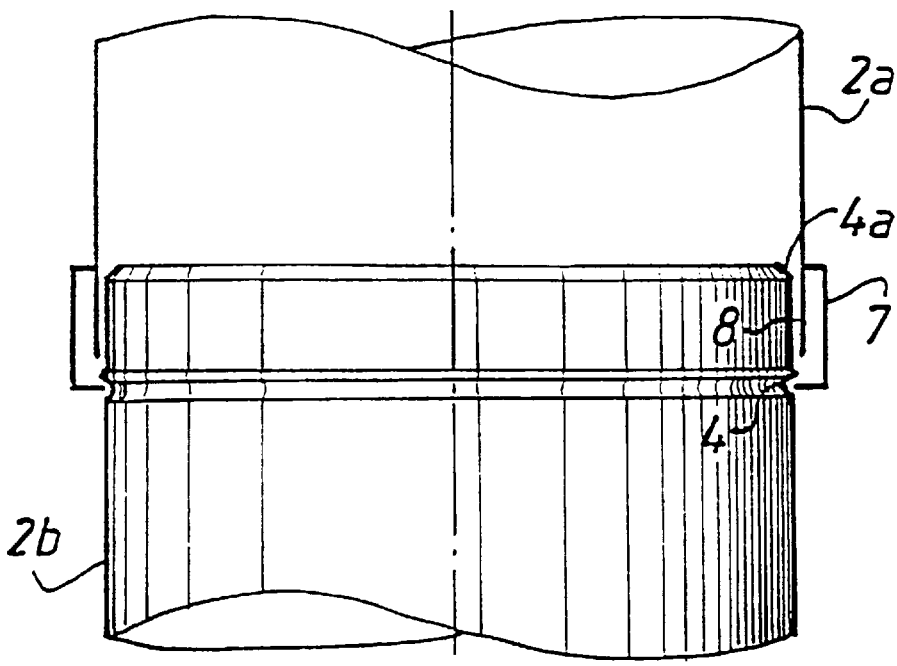
FIG. 5 is a view of the same item after being cut to length.

The duct can be used on its own. Nevertheless, it is often necessary for it to be insulated, and in conventional manner provision can be made on the outside of the inner duct 1 for an outer duct or envelope 2, as shown in FIGS. 4 and 5. This envelope is naturally of diameter greater than the diameter of the duct 1 and can be used for delivering air to boiler rooms. It is assembled using the same assembly device as that of the inner duct so its bottom portion can be cut off to adapt it to the space available. Under such circumstances, no gasket is provided, since sealing is not essential. The duct can be used on its own for providing ventilation from above. As shown in FIG. 4, the element 2a is the female element while the element 2b is the male element. The top portion of the element 2b lies in a groove 4 into which one of the sides of the collar 7 penetrates. Similarly, the bottom portion of the element 2a also has a groove 4 into which the other side of the collar 7 penetrates. Above the groove 4 of the element 2b there is provided a setback 8 which penetrates into the element 2a.

As can be seen in FIG. 5, when the element 2a has its bottom portion cut to the desired height, its groove 4 disappears and the collar 7 continues to be connected in the same way. In ducts of this type, the thickness of the sheet metal is about half a millimeter, or greater, depending on the section of the duct. That is to say that the dimensions in the figure are not a true representation of the structure.

Figure 6:
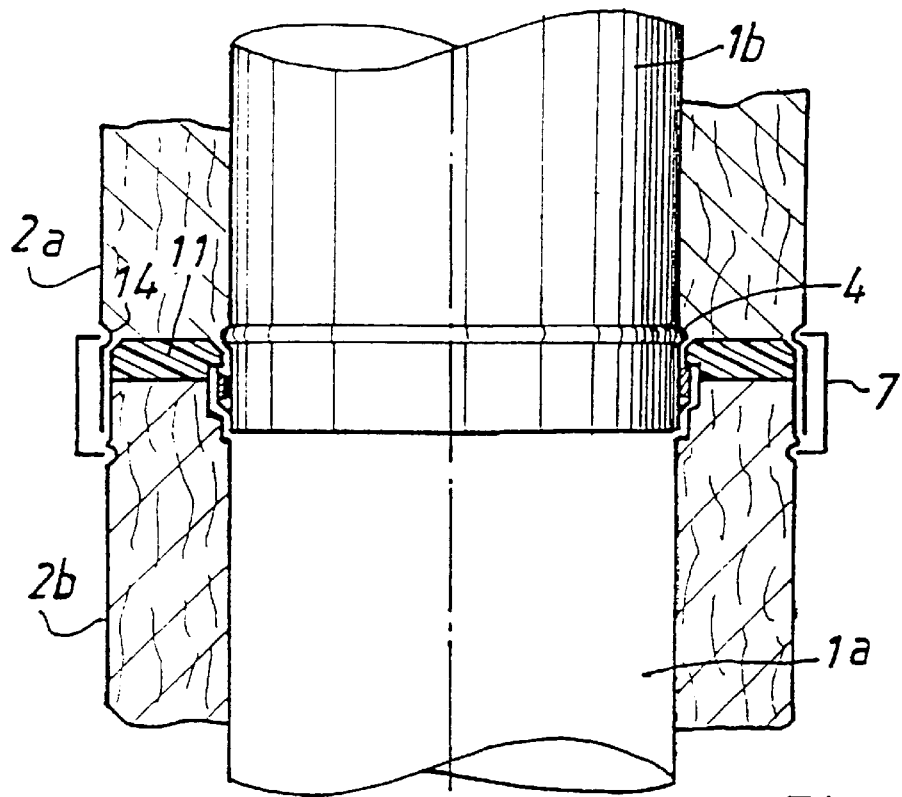
FIG. 6 is a view of an inner duct assembled to an outer duct.
Figure 7:
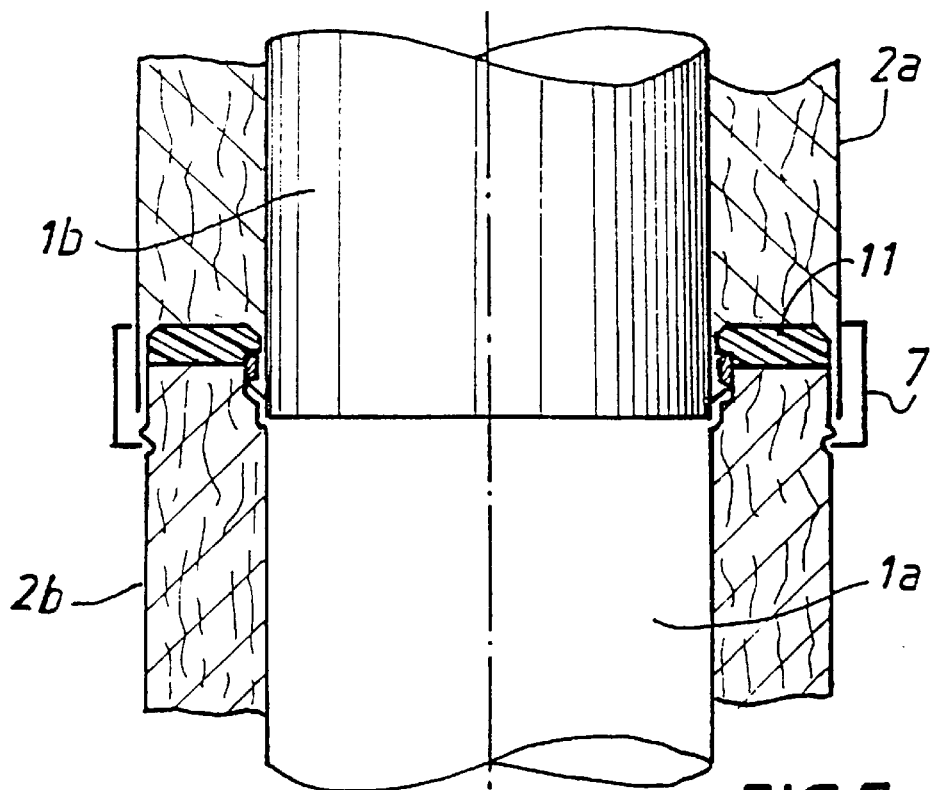
FIG. 7 shows the same assembly as FIG. 6, after being cut to length.

A duct having two envelopes is shown in FIGS. 6 and 7. It comprises an inner duct as shown in FIG. 1 mounted inside an outer duct as shown in FIG. 4. Two concentric elements 1 and 2 are assembled via a gasket 11 stuck at a head end and which also serves as a spacer, it being possible to insert insulation 12 between the ducts 1 and 2, for example mineral wool or ceramic fibers if it is desired to insulate the inner duct. FIG. 7 shows a duct element after it has been cut to length, the rim 14 of the element 1b and the groove 4 of the element 2a having been cut off.

FIG. 6a shows an alternative way of assembling the inner and outer ducts at the top portion thereof. In this figure, only one of the sides of the duct is shown. The items mentioned above are shown again, i.e. the inner duct 1a and the outer duct 2b, the lip gasket 6 and its fold chamber, the lip gasket 6 providing sealing relative to the upper element 1b of the assembly (not shown). In this embodiment, the gasket 11 at the head end is omitted and replaced by a leakproof weld 11a uniting the inner duct element 1a to the outer duct element 2b, In some working conditions, this embodiment is preferable since it provides better sealing at lower cost. Naturally, this disposition can be used in the assembly where the envelope is automatically stable, as described below.

Figure 8:
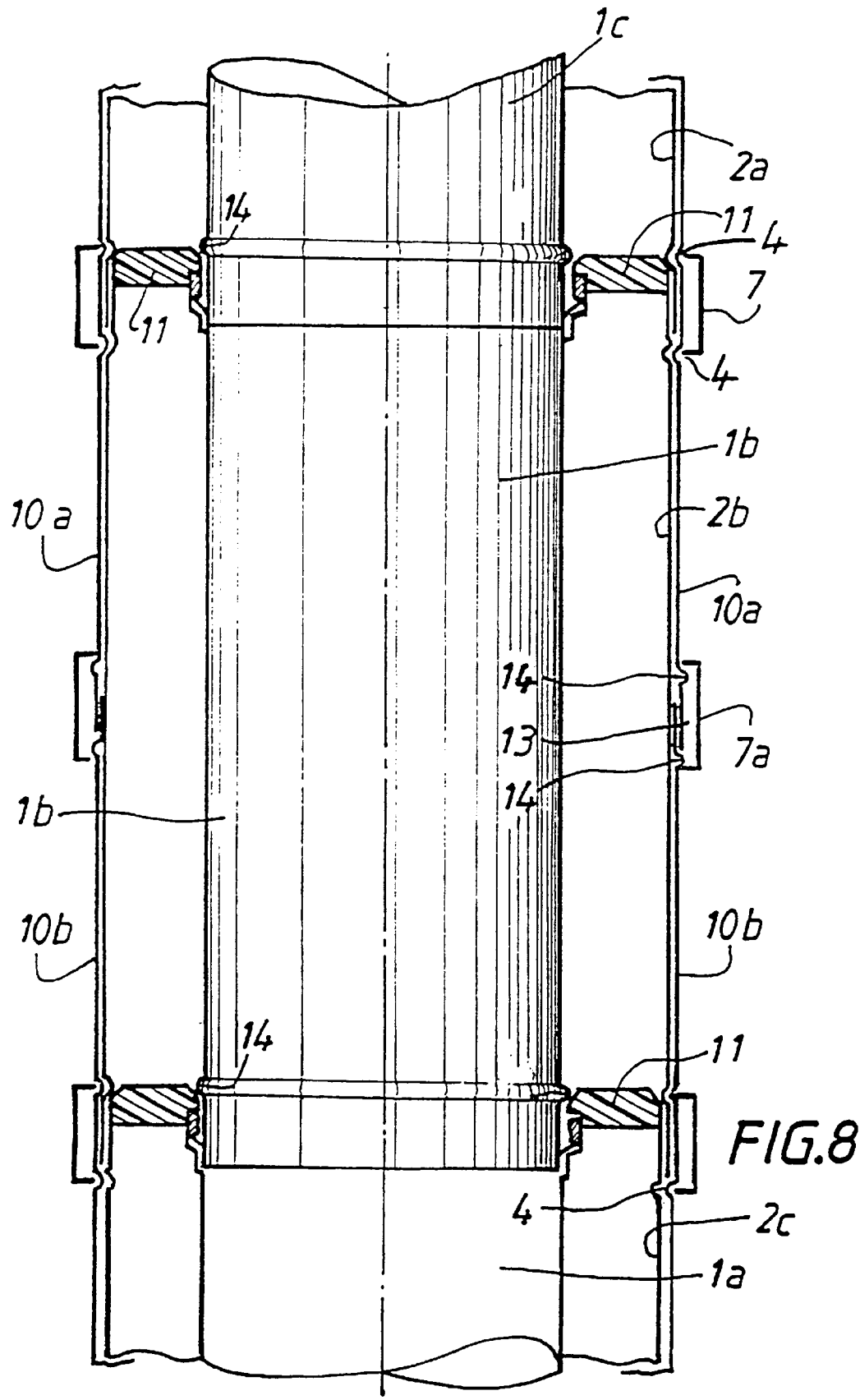
FIG. 8 is a section view of a chimney comprising two ducts provided with an outer coating.
Figure 10:
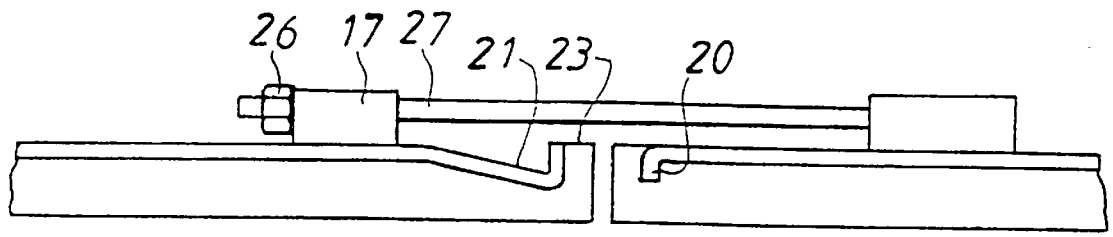
FIG. 10 is a fragmentary view of the two ends of the collar prior to being assembled together, shown in section on a plane perpendicular to the plane of FIG. 9.

FIG. 8 shows another embodiment of the invention designed to constitute an automatically stable chimney having three envelopes. This figure has the elements 1a, 1b, and 1c constituting the inner duct, which elements are interfitted via lip gaskets 6 as described above, and the figure also shows, at least in part, three outer envelope elements 2a, 2b, and 2c, with the two ducts being interconnected by gaskets 11 with or without mineral wool or the like being inserted between the ducts. However the space 12 can be left empty for the purpose of delivering outside air to the burner, which air flows in the opposite direction to the flue gases, with the flue gases going up inside the duct 1 which therefore acts as a heat exchanger for heating the incoming air while simultaneously cooling the outgoing flue gases.

In this embodiment, it is possible only to assemble together elements of standard length made up of an inner duct 1 and an outer duct 2. The periphery of the outer duct 2 is pressed against a load-carrying envelope or shell 10 which is itself made up of elements 10a, 10b, etc. that are assembled together by collars 7a with two adjacent edges 13 being superposed. In general, the shell 10 is in the form of a hollow cylinder or sheath for assembling together pairs of successive elements 1, 2.

As can be seen in FIG. 8, the envelope or shell 10 has grooves 4 disposed substantially facing grooves 4 of the element 2, and interfitting therewith. The space between two series of grooves 4 of the elements 10 is the same as the space between two series of grooves 4 of the envelope 10 of the elements 2. In the middle of each element 10 there are formed two rims 14 on the shell 10 for the purpose of holding an assembly collar 7a of the outer envelope. It can be sent that this interconnection takes place on the rigid portion halfway between two interconnections between elements 1, 2. The three envelopes 1, 2, and 10 are thus disposed in a staggered configuration which provides good stiffness and which makes it possible to take up the load at the bottom of the ducts even when the column is tall, and serve to stabilize the top thereof. This assembly technique guarantees stability by projecting above the last attachment point without a mast and without stays, depending on its location.

The collars 7 can be of the type known by the registered trademarks SERFLEX or JULILEE clip. Nevertheless, in such collars, the lateral tension exerted results from the presence of only one or two welds.

Figure 9:
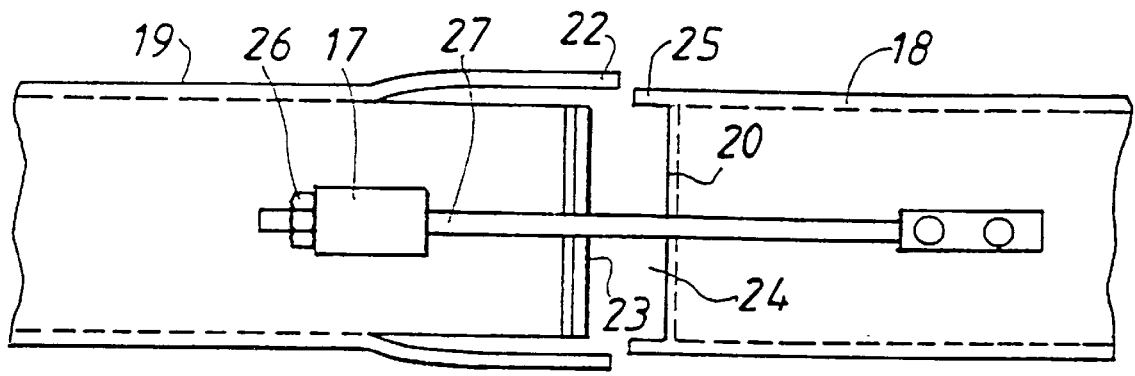
FIG. 9 is a face view of the collar connection zone.

In the invention, it is preferable to use a collar of the kind shown in FIGS. 9 to 12 in which traction strength is the result of the structure of the collar. In FIG. 9, it can be seen that the end 19 of the collar 7 has two spaced-apart branches 22 within which there is inserted the second end 18 via the edges 25. The central portion 23 of the end 19 has a cavity or depression 21 which can be seen in FIG. 10.

Figure 11:
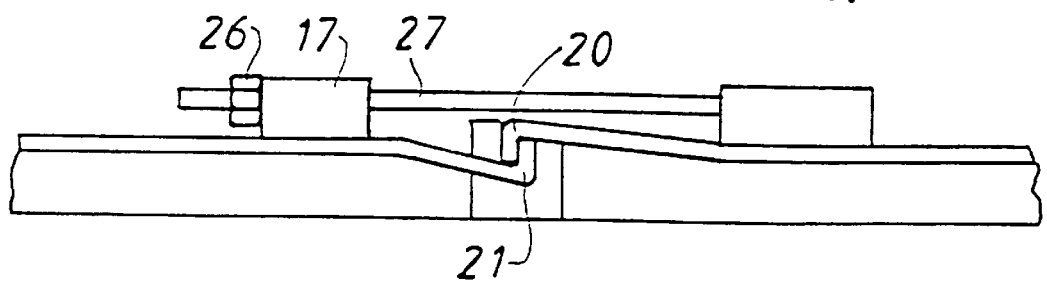
FIG. 11 shows the ends of the collar after assembly, under the same conditions as in FIG. 10.
Figure 12:
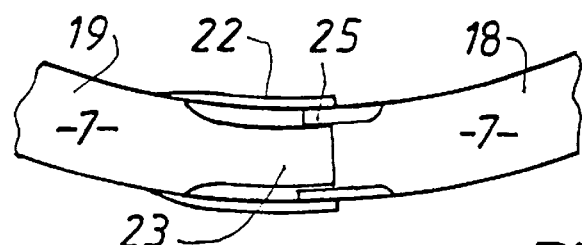
FIG. 12 is a perspective view of an assembly zone.

As shown in FIG. 11, after the ends 18 and 19 have been brought together, the hook 20 formed in the central portion is resiliently inserted into the cavity 21 so as to lock the two ends together, with the overlap of the outer edges preventing any sliding of the hook 20 in the cavity 21.

Under such conditions, it is the collar itself that acts as a catch. However the catch is locked by a mechanical member which provides no tension but which holds the collar in position.

As can be seen in the figures, a sleeve 17 is fixed on the end 19 and, in an internal bore, it receives a threaded rod 27 welded at one end to the end 18 and held against the sleeve 17 by a nut 29. The assembly 17, 26, 27 serves only to hold the various parts of the collar in position. Unlike the prior art, it is not this assembly which provides tension, but the collar itself.

Although the above description is given using as an example a duct for flue gases, the invention can be applied to any type of duct, for example a duct for air conditioning.

Naturally, numerous variants can be provided, in particular by substituting equivalent technical means, without thereby going beyond the ambit of the invention.

What is claimed is:

1. A double walled interfitting modular duct for a chimney, the duct having interconnected elements, each of the interconnecting elements comprising an outer duct and an inner duct, the outer and inner ducts each having a male end and a female end, wherein the male and female ends alternate within each element, each said female end of the inner and outer duct elements being dimensioned and structured for engaging the corresponding male end of an adjacent corresponding inner and outer duct element at any selected point along a length of the male end, wherein the female end of each said inner duct element includes a first gasket having a lip, and a chamber formed adjacent to the lip of the first gasket, the first gasket and chamber of the female end being engageable over the male end of the inner duct of an adjacent element, whereby the male end can be cut to adapt a length of the duct to an available space by engaging the female end at the selected point, two inner and outer duct elements being assembled together via a second annular gasket attached to an axial end of a duct element having a female end on the inner duct and a male end on the outer duct, the second annular gasket being located between the inner duct between the inner and outer duct elements.

2. A duct according to claim 1, including an outer duct surrounding an inner duct, the outer duct having a female portion mounted in the opposite direction to the female portion of the inner duct, an inner duct element and an outer duct element being assembled together by means of a weld.

3. A duct according to claim 1, comprising a modular envelope for assembling together two successive elements, the modular envelope being assembled together by superposing two edges of envelope elements, said superposition taking place in the middle of the length of the inner and outer duct elements, the superposed edges being secured together by a collar.

4. A duct according to claim 3, wherein the outer duct has grooves in which branches of the collar are inserted.

5. A duct according to claim 3, comprising two grooves located substantially half-way up a height the envelope, said two grooves corresponding to the grooves of the outer duct.

6. A duct according to claim 3, comprising a rim located in a vicinity of an end of the envelope, and a collar bearing against the rim.

7. A duct according to claim 3, comprising a metal strip folded over onto itself and tensioning means, wherein the collar has a first end having a hook and a second end having a groove or cavity in which the hook is resiliently received.

8. A duct according to claim 7, wherein the second end has a flare into which the first end penetrates.

9. A duct according to claim 8, wherein the central portion of the second end is inserted in a setback of the first end.

* * * * *